United States Patent [19]
Fenton et al.

[11] Patent Number: 5,619,555
[45] Date of Patent: Apr. 8, 1997

[54] GRAPHICAL COMPUTER INTERFACE FOR AN AUDIO CONFERENCING SYSTEM

[75] Inventors: Wayne Fenton; Glenn A. Eaton, both of San Jose; Joseph A. McFadden, Palo Alto; Stuart A. Taylor, Menlo Park; Edward D. Tracy, Palo Alto; Emil C. W. Wang, Menlo Park, all of Calif.

[73] Assignee: Latitude Communications, Santa Clara, Calif.

[21] Appl. No.: 508,553

[22] Filed: Jul. 28, 1995

[51] Int. Cl.⁶ ..................................................... H04M 3/56
[52] U.S. Cl. ........................... 379/67; 379/196; 379/202; 379/204
[58] Field of Search ..................... 379/202, 203, 379/204, 205, 209, 210, 201, 67, 88, 89, 196; 348/14, 15, 16; 370/62

[56] References Cited

U.S. PATENT DOCUMENTS

| | | |
|---|---|---|
| 4,550,224 | 10/1985 | Winchell . |
| 4,600,814 | 7/1986 | Cunniff et al. ........................ 379/202 |
| 4,650,929 | 3/1987 | Boerger et al. . |
| 4,654,483 | 3/1987 | Imai et al. . |
| 4,656,654 | 4/1987 | Dumas . |
| 4,710,917 | 12/1987 | Tompkins et al. . |

(List continued on next page.)

FOREIGN PATENT DOCUMENTS

| | | |
|---|---|---|
| 326263A | 8/1989 | European Pat. Off. . |
| 601766A1 | 11/1993 | European Pat. Off. . |
| 3818086A | 12/1989 | Germany . |
| 59-589955 | 4/1984 | Japan . |
| 63-56049 | 3/1988 | Japan . |
| 63-172554 | 7/1988 | Japan . |

(List continued on next page.)

OTHER PUBLICATIONS

Haszto E.D. et al; "Alliance® Teleconferencing Services Boost Business Efficiency", AT&T Technology, vol. 3, No. 1, 1988, pp. 22–312.

Clark, W., "Multipoint Multimedia Conferencing", IEEE Communications Magazine, May 1992, pp. 44–50.

IBM Technical Disclosure Bulletin, "User Interface Design for Videoconferencing Entries", vol. 37, No. 04A, Apr. 1994, pp. 539–540.

IBM Technical Disclosure Bulletin, "Simple Multimedia Conferencing", vol. 38, No. 08, Aug. 1995, pp. 135–136.

*Primary Examiner*—Thomas W. Brown
*Assistant Examiner*—Scott Wolinsky
*Attorney, Agent, or Firm*—Blakely, Sokoloff, Taylor & Zafman

[57] ABSTRACT

A audio conferencing system is provided whereby an audio conference participant interfaces with the system through a graphical user interface (GUI) computer program running on a remote computer or workstation. To join an audio conference currently in progress, a participant controls the GUI computer program to transmit a signal over a local area network to a central server. The central server, by examining database information, determines whether the participant is authorized to join the audio conference. If so, the central server controls a telephone system connected thereto and causes the telephone system to call the participant at a pre-listed telephone number. The participant then joins the actual audio conference merely by answering the telephone. Numerous other functions are available to the audio participant both during an audio conference and other times. By providing a GUI-based software interface to the audio conferencing system, significantly greater functionality is conveniently provided to an audio conference participant than previously available. For example, before an audio conference has begun, an invitee to the conference may obtain and display a list of all other conference invitees. Method and apparatus embodiment to the invention are disclosed.

60 Claims, 12 Drawing Sheets

U.S. PATENT DOCUMENTS

| | | |
|---|---|---|
| 4,716,585 | 12/1987 | Tompkins et al. . |
| 4,736,407 | 4/1988 | Dumas . |
| 4,796,293 | 1/1989 | Blinken et al. ............................ 379/202 |
| 4,807,154 | 2/1989 | Scully et al. . |
| 4,807,155 | 2/1989 | Cree et al. . |
| 4,847,829 | 7/1989 | Tompkins et al. . |
| 4,893,326 | 1/1990 | Duran et al. . |
| 4,937,856 | 6/1990 | Natarjan . |
| 4,939,509 | 7/1990 | Barhtolomew et al. . |
| 4,953,159 | 8/1990 | Hayden et al. . |
| 5,003,532 | 3/1991 | Ashida et al. . |
| 5,014,267 | 5/1991 | Tompkins et al. . |
| 5,050,077 | 9/1991 | Vincent . |
| 5,099,510 | 3/1992 | Blinken, Jr. et al. ..................... 379/202 |
| 5,136,581 | 8/1992 | Muehrcke ................................ 379/202 |
| 5,164,982 | 11/1992 | Davis . |
| 5,195,086 | 3/1993 | Baumgartner et al. . |
| 5,197,000 | 3/1993 | Vincent . |
| 5,247,615 | 9/1993 | Mori et al. . |
| 5,261,045 | 11/1993 | Scully et al. . |
| 5,272,526 | 12/1993 | Yoneta et al. . |
| 5,283,638 | 2/1994 | Enberg et al. . |
| 5,283,819 | 2/1994 | Glick et al. . |
| 5,303,145 | 4/1994 | Griffin et al. . |
| 5,317,683 | 5/1994 | Hager et al. . |
| 5,323,445 | 6/1994 | Nakatsuka ............................... 379/202 |
| 5,335,011 | 8/1994 | Addeo et al. . |
| 5,347,306 | 9/1994 | Nitta . |
| 5,365,264 | 11/1994 | Inoue et al. . |
| 5,369,693 | 11/1994 | Pillet et al. . |
| 5,373,549 | 12/1994 | Bales et al. ............................. 379/204 |
| 5,374,952 | 12/1994 | Flohr . |
| 5,375,068 | 12/1994 | Palmer et al. . |
| 5,375,200 | 12/1994 | Dugan et al. . |
| 5,408,518 | 4/1995 | Yunoki .................................... 379/202 |
| 5,422,883 | 6/1995 | Hauris et al. . |
| 5,434,913 | 7/1995 | Tung et al. . |
| 5,438,357 | 8/1995 | McNelley . |
| 5,440,624 | 8/1995 | Schoof, II . |
| 5,442,771 | 8/1995 | Filepp et al. . |
| 5,444,477 | 8/1995 | Yamadera et al. . |
| 5,483,587 | 1/1996 | Hogan et al. ........................... 379/202 |

FOREIGN PATENT DOCUMENTS

| | | |
|---|---|---|
| 1-49465 | 2/1989 | Japan . |
| 3-58658 | 3/1991 | Japan . |
| 3-214838 | 9/1991 | Japan . |
| 4-332243 | 11/1992 | Japan . |
| 5-48603 | 2/1993 | Japan . |
| 5-267160 | 10/1993 | Japan . |
| 5-327707 | 12/1993 | Japan . |

FIG. 2

Conference record format in database:

| |
|---|
| Date and time of conference (GMT) |
| Meeting name. text. |
| Meeting length. in minutes. |
| Direct dial number. digits |
| Frequency -- daily, weekly, monthly |
| Number of participants |
| Password required? y/n |
| Password. digits. |
| Announce arrivals? y/n |
| Announce departures? y/n |
| Record meeting automatically? y/n |
| Meeting agenda. text. |
| Meeting participant 1: user ID |
| Meeting participant 2: user ID |
| Meeting participant 3: user ID |
| ....... continue listing all participants. |

User profile record format in database:

| |
|---|
| User ID |
| Last name. text. |
| First name. text |
| user type/privilege level. end user, contact, attendant, system administrator |
| password from phone. digits. |
| password from workstation. text. |
| status -- inactive/active |
| group association. text name of group. |
| billing code. text. |
| home time zone. number. |
| contact person. user ID |
| prompting level -- normal/advanced |
| |
| Meeting Defaults: |
|     Announce arrivals? |
|     Announce departures? |
|     Record meetings? |
|     Password required? |

~38

GRAPHICAL COMPUTER INTERFACE FOR AN AUDIO CONFERENCING SYSTEM

BACKGROUND OF THE INVENTION

1. Field of the Invention

The invention generally relates to audio conferencing systems.

2. Copyright Notice

The present application describes and illustrates original works in which the assignee of the application retains copyright interests. After a patent issues, hard copies may be made of any portions of the patent. However, the assignee retains all other copyright interests pertaining to any works described or illustrated herein.

3. Related Patent Applications

The present application is related to U.S. patent application Ser. No. 08/363,720, filed Dec. 23, 1994, entitled, "Voice Processing Interface for a Teleconferencing System" (the '720 patent application), which issued as U.S. Pat. No. 5,483,588 on Jan. 9, 1996, and is incorporated by reference herein.

4. Description of Related Art

Audio conferencing or teleconferencing is becoming increasingly popular, in part, to minimize costs associated with actual in-person conferences, such as transportation cost. With an audio conference, each conference attendee merely speaks with others through a telephone. The conference attendees may be at widely separate locations. Indeed, conference attendees may be in entirely separate countries.

The earliest audio conferencing systems employ private branch exchange (PBX) telephone systems wherein a first audio conference attendee calls a second attendee; places the second attendee on hold; calls a third attendee; places the third attendee on hold; and repeats the process until all conference attendees have been connected to the audio conference. Such PBX-based audio conferencing have numerous disadvantages. In particular, the audio conference is difficult to coordinate and initiate. Also, significant degradation in voice quality occurs when three or more parties are conferenced together.

One alternative to PBX-based audio conferencing has utilized service bureau providers to coordinate and initiate the audio conference. The service bureau provider, which may be the local phone company, employs a human operator to speak with callers wishing to engage in an audio conference. The operator handles any necessary telephone connecting and switching functions to enable the audio conference to occur. The use of a service bureau employing a human operator offers superior functionality over conventional PBX-based audio conferencing. However, many disadvantages remain. For example, it may difficult, or impossible, to initiate an audio conference if the human operator is unavailable such as may occur during evenings or weekends. Moreover, if confidential matters are to be discussed during the audio conference, it may be difficult to maintain confidentiality with a human operator monitoring the audio conference. Also, because a human operator is required, the overall costs associated with the audio conference may be significant.

Other disadvantages of PBX-based and service bureau-based audio conferencing are discussed in the '720 patent application. The '720 patent application also discloses an automated audio conferencing system which eliminates many of the disadvantages of conventional PBX-based and service bureau-based audio conferencing systems. Briefly, an audio conferencing system is described whereby conference attendees communicate with an automated central system using touch-tone telephones. By transmitting various DTMF tones to the central system using touch tone phones, the conference attendee can perform many of the functions otherwise performed by a human operator within a service bureau-based audio conferencing system. Indeed, the system not only eliminates the need for a human operator but provides additional functionality beyond that which is customarily provided by service bureau-based systems.

Although the audio conferencing system of the '720 patent application offers a significant improvement over conventional audio conferencing systems, there remains room for still further improvement. For example, because all communication with the audio conferencing system is through the telephone, a conference attendee cannot easily speak and transmit control signals at the same time. Moreover, if a conference attendee is not familiar with the necessary commands to be transmitted using the DTMF tones, it may be difficult for the attendee to properly interface with the audio conferencing system. Furthermore, although many additional functions are available than provided in conventional systems, many other desirable functions are still not available. For example, a user cannot obtain a visible list of conference invitees before the conference has begun. Rather, a user can only obtain an audio list or "roll call" of actual attendees.

Accordingly, it would be desirable to provide an improved audio conferencing system which incorporates the automatically controlled functionality of the system of the '720 patent application, yet which does not limit the user to communicating with the system using only a telephone and which provides even greater functionality that the system of the '720 patent application. It is to these and other ends that the invention is drawn.

SUMMARY OF THE INVENTION

The invention relates to an audio conferencing system which provides automatic audio conferencing control without requiring a human operator and which does not require conference attendees to interface with the automated system solely using a touch-tone telephone. Rather, conference attendees interface with the automated system using a remote computer running a graphical user interface (GUI) program.

In one embodiment, the audio conferencing system includes a central server connected to a telephone system. A remote computer or workstation is connected to the central server via a local area network (LAN). The GUI program runs on the remote computer. In one embodiment, the GUI presents graphically to the user the option of joining a teleconference selected from one or more available teleconferences. The GUI program receives from the user an indication of a selected audio conference that the user operating the remote computer wishes to join and transmits the indication of the selected audio conference to the central server. The central server, upon receiving the selection, controls the telephone system to call the user at a pre-listed telephone number to connect the telephone located at the pre-listed or concurrently entered telephone number to the selected audio conference, such that the user may join the audio conference simply by answering the telephone call.

The GUI receives the selection of the audio conference from the user by displaying a list of audio conferences that the user is authorized to join and allowing the user to select one of the audio conferences. The user is authorized to attend any audio conference for which he or she is an invited participant or for which he or she is a designated organizer.

The audio conferencing system of the invention provides numerous other functions as well. For example, through the GUI, a user can obtain audio conference information including a list of all invited participants, the scheduled date and time of the audio conference, whether the conference is a one-time conference or a recurring conference, the scheduled lengths of the conference and a textual agenda for the conference. The user can also display and change the pre-listed telephone number employed by the system to call user when connecting the user to an audio conference. To maintain security, the audio conferencing system may require the user to log into the system using a password. Indeed, each individual audio conference may have an associated password. Information regarding audio conferences, passwords, log-in IDs, etc., is stored within a database forming part of the central server.

The audio conferencing system also provides numerous functions for use while an audio conference is in progress. For example, the GUI may display a list of all attendees actually participating in the audio conference and provide an indication of which conference attendee is actually speaking. The user may enable or disable recording of the conference and on/off recording status is reflected on the GUI. Some attendees may be designated as authorized speakers whereas others are authorized merely to listen to the conference. The GUI also provides an indication of which participants of the conference are allowed to speak. One or more sub-conferences or "break-out" sessions may also be designated. A user may join a sub-conference merely by selecting from a list of current sub-conferences using the GUI. All information associated with the conference while the conference is occurring is updated substantially in real time on the GUI of the remote computer.

Depending upon the implementation, attendance at an audio conference may be limited only to users having a remote computer connected to the central server with the remote computer running the appropriate GUI software. However, in other implementations, users who do not have a remote computer running the GUI program may nevertheless join the audio conference. Depending upon the implementation, such users interface with the central server using DTMF-tone based signals such as described in the '720 patent application.

Thus, an audio conferencing system is provided which employs an automated central conferencing system such that a human operator is not required, yet which does not require users to interface or communicate with the central system solely using a touch tone phone. Rather, users operate a remote computer running a GUI program which provides a convenient interface to the central control system and which provides enhanced functionality over systems requiring users to communicate with the central system solely through DTMF signals. As such, the general object of the invention set forth above is achieved. Other objects, features and advantages of the invention will be apparent from the detailed description which follows and from the drawings attached hereto.

BRIEF DESCRIPTION OF THE DRAWINGS

FIG. 2 illustrates a database record stored within a database of the system of FIG. 1 providing information associated with a single audio conference.

FIG. 3 illustrates a database record stored within the database of FIG. 1 providing information associated with a single end user.

DETAILED DESCRIPTION OF EXEMPLARY EMBODIMENTS

Referring to the figures, exemplary embodiments of the invention will now be described. The exemplary embodiments are described primarily with reference to flowcharts. Each block or element of the flowcharts illustrate both a method step and an apparatus element for performing the stated method step. Depending upon the implementation, the corresponding apparatus element may be a general purpose computer running a computer program or portion thereof such as a sub-program or sub-routine. In other cases, however, the apparatus element may be a hardware or firmware element.

Figure 1:
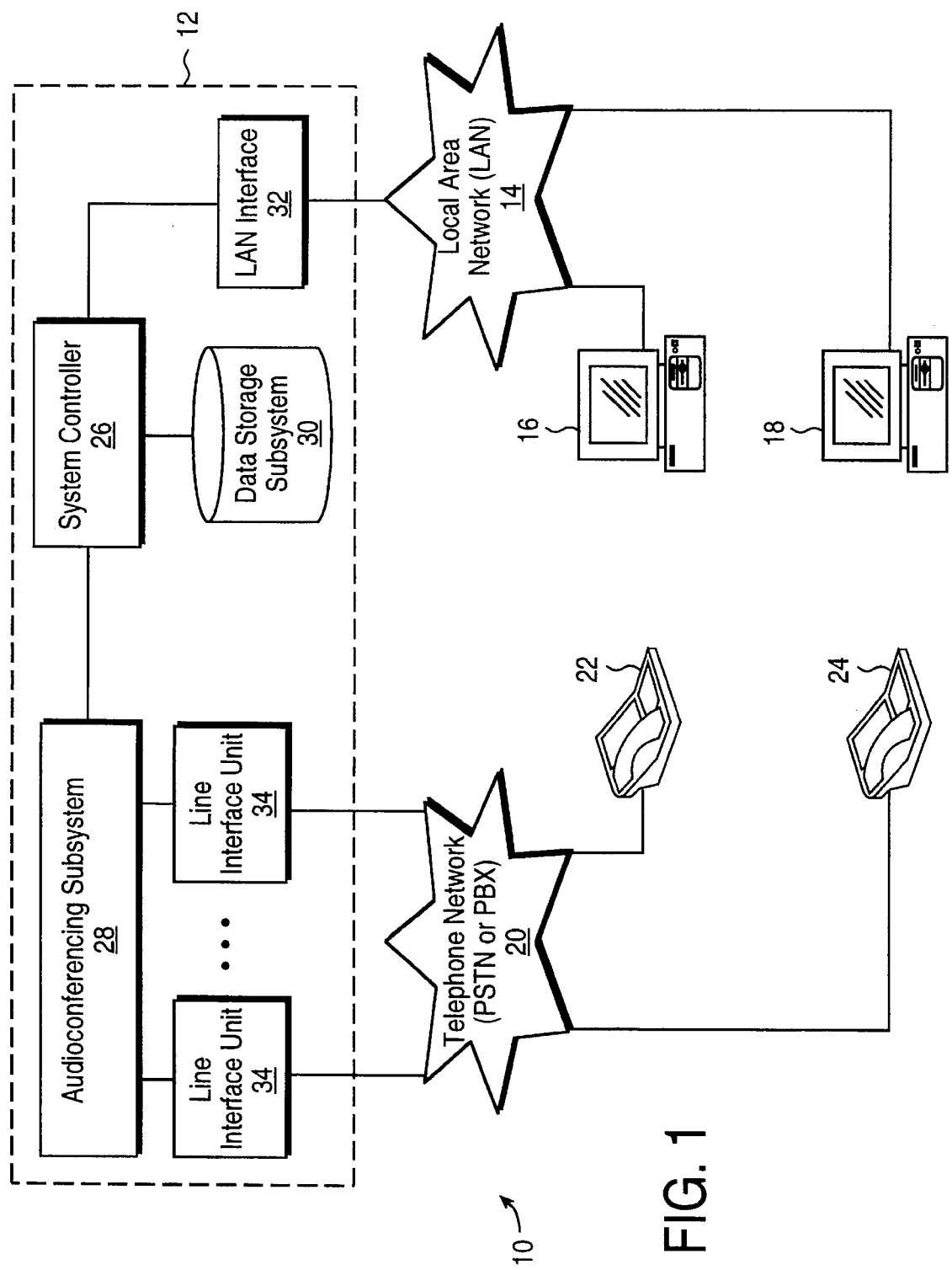
FIG. 1 is a block diagram illustrating an audio conferencing system configured in accordance with the principles of the invention.

FIG. 1 illustrates an audio conferencing system 10 having a central server 12 connected through a LAN 14 to a pair of remote computers or workstations 16 and 18 and through a telephone network 20 to a pair of remote telephone sets 22 and 24. The telephone sets are not directly associated with the remote computers. However, for ease of customer use, a telephone is preferably located in the vicinity of a remote computer. Thus, for example, phone 22 may reside within the office of an end user A. Phone 24 may reside within the office of an end user B. The offices of end user A and B may be widely separated. Although only a single pair of remote computers and associated telephones are illustrated, the system may operate in connection with a large number of remote computers and telephones. Telephone network 20 may be a public switch telephone network (PSTN) or a PBX. LAN 14 may be any of a number of conventional LANs.

Alternatively, the remote computers may be connected through PSTN or PBX telephone lines to central server 12 using modems.

Central server 12 includes components for initiating, controlling and terminating audio conferences. More specifically, central server 12 includes a system controller 26 which receives audio conference information and commands from end users through the remote computers and controls an audio conferencing subsystem 28 to initiate audio conferences. The audio conferences are actually conducted between end users speaking through their respective telephone sets, such as telephone sets 22 and 24. The central server also includes components for recording audio conferences in progress.

To facilitate the control of audio conferences, central server 12 includes a data storage subsystem 30 containing information regarding each audio conference and each potential audio conference attendee (or end user). Central server 12 also includes a LAN interface 32 for allowing controller 26 to receive information and transmit information to LAN 14. Server 12 also includes a set of line interface units 34 provided for allowing audio conferencing subsystem 28 to control telephone network 20 to accommodate actual audio conferences.

Each remote computer runs a GUI program which allows a user operating the remote computer to control the central server to provide information regarding audio conferences and to control other audio conference functions. Briefly, to join an audio conference, an end user selects the audio conference from a list of conferences provided by the GUI (not shown in FIG. 1) running on the remote computer of the user. The remote computer transmits a signal identifying the selected conference to the system controller. The system controller accesses the data storage subsystem to determine if the user is authorized to join the conference and to determine the default telephone number of the phone set of the end user. After allowing the end user to confirm or change the phone number to be called, the system controller controls the audio conferencing subsystem to call the telephone set through the telephone network. The end user then answers the phone and thereby joins the audio conference. As noted above, the telephone may reside at the same location as the remote computer. However, such is not necessary. For example, a user may cause the system to call a telephone located in a conference room at a location distant from where the remote computer itself resides.

When the user joins the conference, the name of the user is reflected through the GUI programs executing on the remote computers of each of the participants. Also, an audio prompt may be generated by the audio conferencing subsystem for transmission to each of the telephones to audibly notify all current participants of the new participant. While the audio conference is in progress, the end user may display and review information regarding the audio conference through the GUI of his or her remote computer. Eventually, when the user wishes to leave the conference, he or she hangs up the telephone and enters a command through the remote computer indicating that he or she is leaving the audio conference.

Numerous other functions are available to each end user both during participation in an audio conference and at other times as well. The other functions will be described in detail below.

As noted, central server 12 employs a data storage subsystem 30 for storing information pertaining to audio conferences and pertaining to individual users of the system.

FIG. 2 illustrates an exemplary data record 36 within the database for storing information pertaining to an individual audio conference. The stored information includes the date and time of the conference (recorded in GMT), the name of the audio conference and the anticipated length in minutes of the conference. The database also stores a direct dial number which can be used by conference attendees who do not utilize a remote computer running the appropriate GUI software to join a conference. The database also stores information regarding the frequency of the meeting, i.e., whether the meeting is a daily, weekly or monthly meeting. If no information is stored within the frequency field, then the meeting is designated as a one-time only meeting.

The database also stores the expected number of participants in the audio conference. If a password is required for participants to join the audio conference, then that fact is indicated in a "password required" field and the actual digits of the password are stored in the database as well. The database also provides information indicating whether the audio conferencing subsystem should provide an audible announcement of the arrival and departure of each participant. Also, the database includes information indicating whether the meeting should be recorded automatically. The announcement and recordation parameters are initial parameters only. During the actual conference, any authorized user, such as the conference organizer, can change the parameters, for example, to activate or deactivate recording.

If a meeting agenda has been provided, that agenda is stored in text form in the conference database record (not shown in FIG. 2). The database also stores a list of each invitee to the meeting and the corresponding user ID. The user ID represents a unique identification for the individual user.

As noted above, each invitee to an audio conference need not have a remote computer running the appropriate GUI software. Those invitees who do not have the GUI are merely provided with the direct dial number by the conference organizer, perhaps by way of the telephone or regular mail and the invitee then merely dials the direct dial number during the audio conference and is automatically joined into the conference at that time. Nevertheless, depending upon the implementation, such invitees may be identified in the conference database record for the corresponding audio conference. For example, the conference organizer may have the names of all invitees stored in the conference records including those who do not have a remote computer running the appropriate GUI software.

Thus, FIG. 2 illustrates an exemplary data record which may be stored in connection with each audio conference. In another implementations, additional data fields or fewer data fields may be provided.

FIG. 3 illustrates an exemplary data record 38 within the database for storing information pertaining to an individual end user. The user profile record stores information identifying the end user including a user ID and actual first and last names. The user "type" or privilege level is also stored. A user may be designated as an end user, a contact, an attendee or a system administrator. Only users designated as end users may actually participate in audio conferences. Other users may interface with the overall system in other ways which are not pertinent to the present invention and will not be further described.

The user profile record also stores one of two passwords associated with each end user. The first password is one provided over a telephone using DTMF tones. The other is a textual password provided from the remote computer or workstation of the user. The phone password is provided to allow users to interface with the system solely with the telephone in part to help ensure compatibility with previous phone base systems such as the one described in the '720 patent application.

Other possible information which may stored in a user profile database record is status information, group association information, billing code, and a contact person. The profile record also stores information identifying the home time zone of the end user such that a system can account for differences in time zones while coordinating meetings. The profile record also stores information identifying a prompting level for the end user. For a "normal" prompting level, the GUI software running on the remote computer of the end user is controlled to provide numerous prompts to assist the end user in operating the software. If the prompting level is set to "advanced", then it is assumed that the end user is highly familiar with the system and does not require numerous prompts. Accordingly, the GUI software is controlled to provide minimal prompts.

Finally, with the regard to the user profile database record, the record stores default information for audio conferences organized by the end user. In particular, the record stores a default indicating whether the end user prefers that conferences will include announcements of arrivals and departures, or that conferences will be recorded, or require a password. This information is used only when the end user organizes an audio conference. At that time, the system creates a conference record (FIG. 2) initially employing the meeting default information set forth in the user profile record. In this manner, a user need not specify such information every time an audio conference is organized. Of course, the end user may change the defaults in his or her corresponding user profile record. Moreover, once the audio conference record for conference organized by the end user has been created, the end user may vary the meeting default information reflected therein as well. The manner by which a new audio conference is organized will not be described in detail herein but may be performed through the GUI of the remote computer.

Having provided an overview of the system and the information stored by the system, the actual steps performed by both the GUI software of a remote computer and system software operating within the central server will now be described with reference to the remaining figures. The operation of the software will be described primarily with reference to a set of flowcharts in connection with various graphical display screens presented to an end user through his or her remote computer. In the flowcharts, steps performed by the GUI software of the remote computer is represented on the left hand side of each flowchart and steps performed by system software of the central server are shown on the right hand side. Communication between the GUI software of remote computer and the system software of the central server is provided through the LAN (FIG. 1).

Figure 4:
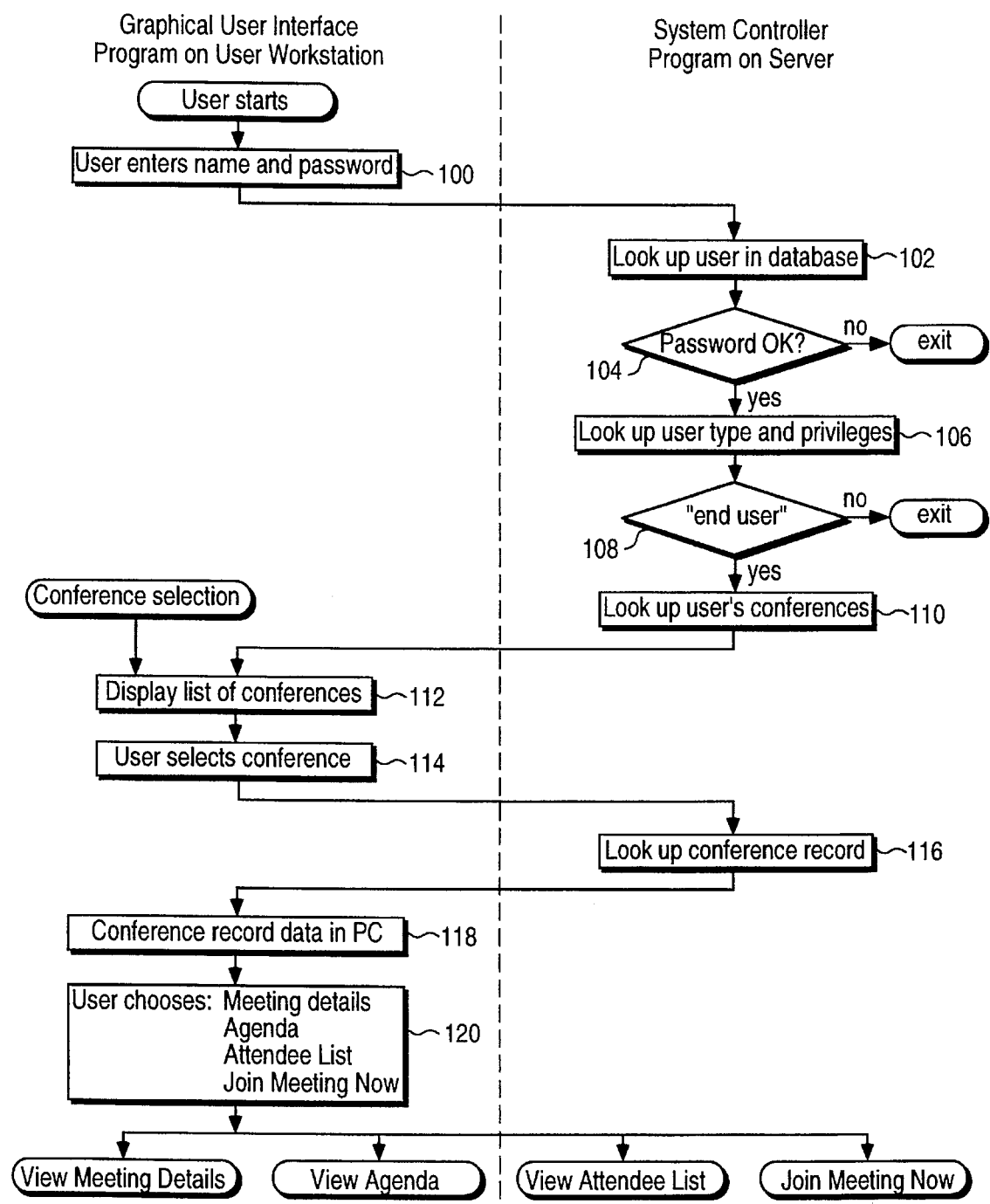
FIG. 4 is a flowchart illustrating a method, performed by the system of FIG. 1, by which an end user accesses audio conference information.
Figure 5:
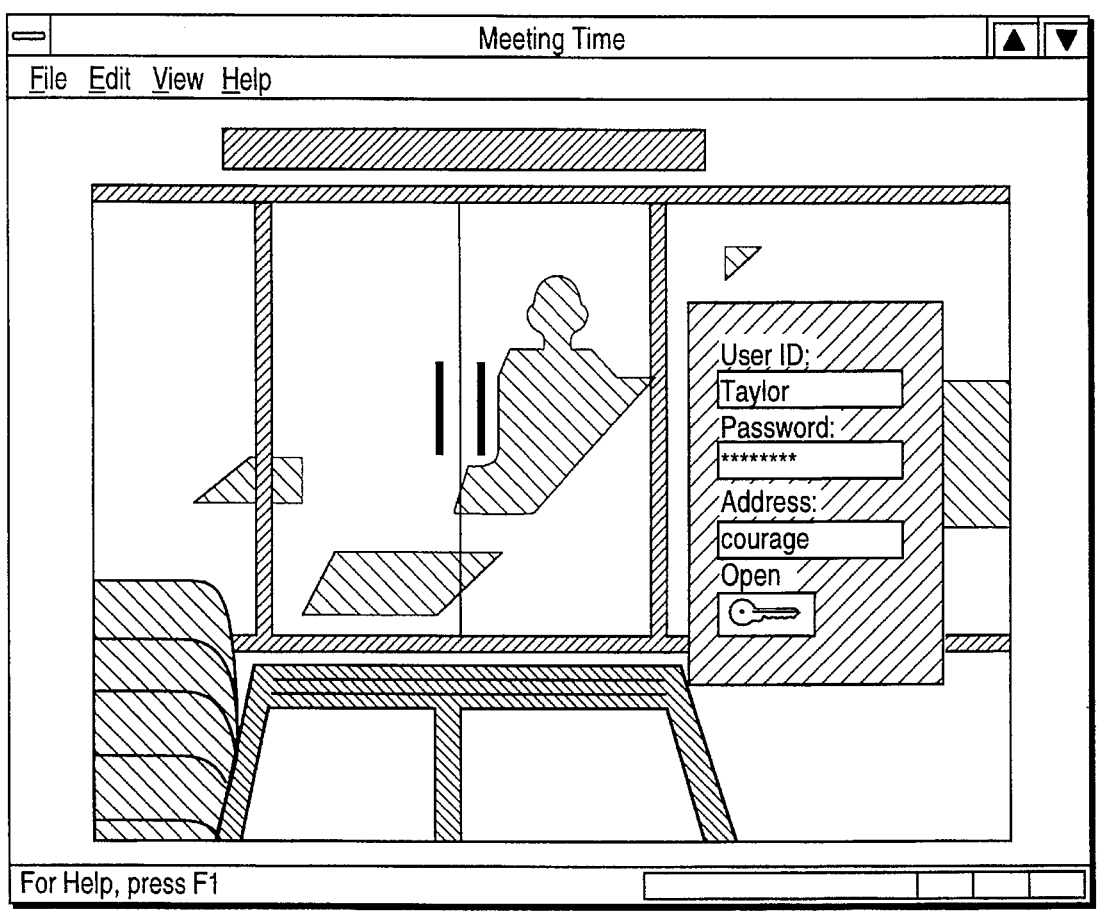
FIG. 5 illustrates a graphical display, used in connection with the method of FIG. 4, through which a user enters ID and password information.

Initially, referring to FIG. 4, an end user initiates operation of the GUI software by entering a user name and password, step 100. FIG. 5 illustrates a display screen presented to the user for receiving the user ID and password. The display screen of FIG. 5, and all other display screens illustrated herein are programmed using Windows® GUI software (Windows is a registered trademark and Windows software is a product of Microsoft Corporation). As such, the GUI software described herein which generates and controls these displays is intended for use on PC-based workstations. Alternatively, however, the GUI software of the invention may be configured for operating on other computer systems such as Macintosh®-based systems (Macintosh is a registered trademark of Apple Computer, Inc.).

In addition to entering a user ID and password, the user enters the address of the central server to which he or she wishes to connect. The address identifies the location of the central server computer within the overall LAN. Thus, it is possible that there may be multiple audio conferencing servers available on the LAN. Once the appropriate information is provided within the input fields illustrated in FIG. 5, the user clicks on the illustrated "key" symbol using a mouse (not shown) and the entered information is transmitted to the central server.

The central server then accesses the user record profile database based upon the user name to verify the password and to determine the privilege of the user, steps 102, 104, 106 and 108 of FIG. 4. If either the password is incorrect or the user is not an end user, the system terminates further processing and sends appropriate information to the GUI program indicating that either an invalid password has been entered or that the user is not an authorized end user.

Assuming that the password is correct and the user privilege is an "end user", the system then examines the conference record database to identify any audio conferences for which the user is an authorized participant, step 110. An authorized participant is either the conference organizer or any invited conference participant. Information regarding the audio conferences of the end user is sent to the GUI program of the remote computer which displays a list of the audio conferences and allow the user to select one, steps 112 and 114. Once a particular audio conference is selected, the system controller accesses the conference record database, step 116, to retrieve corresponding conference information. The conference information is transmitted to the remote computer, step 118. At step 120, the user chooses whether to view details of the meeting, view the meeting agenda, view the attendee list or join the meeting.

Figure 6:
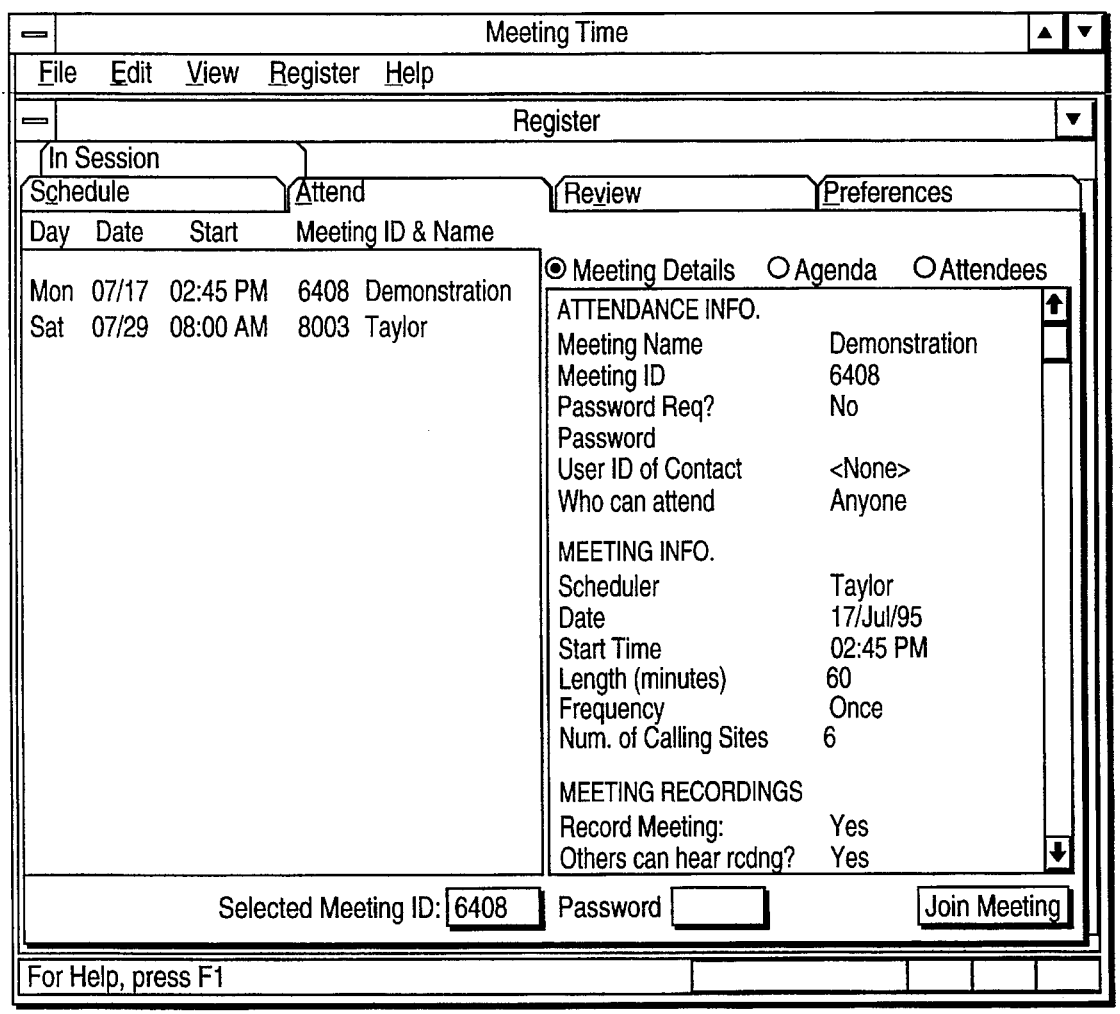
FIG. 6 illustrates a second graphical display, used in connection with the method of FIG. 4, through which audio conference information is displayed.

If the user chooses to view meeting details, the graphical display screen of FIG. 6 is provided. On the left hand side of the screen, a list of all current or upcoming conferences for which the user is an authorized participant is provided. On the right hand side, information regarding one selected audio conference is set forth. Most of the information in the conference record database for the selected audio conference is displayed. Hence, the user can determine, for example, when the meeting is to take place, whether the meeting will be recorded, etc. Information corresponding to other audio conferences that the user is authorized to participate in may alternatively be displayed by selecting the appropriate audio conference from the left hand side of the display, again using a mouse.

It should be noted that the display of FIG. 6 initially only lists available audio conferences. Detailed information regarding any particular conference is not displayed until the user selects a particular conference and the view meeting details option. The view meeting details option, the view agenda option and the view attendee list option may be selected by clicking on "radio button" controls or by clicking on the "view" pull-down command line. Alternatively, if the selected audio conference is in session, the user may join the audio conference. Such is achieved by clicking on a "join meeting" button on the display of FIG. 6.

Figure 7:
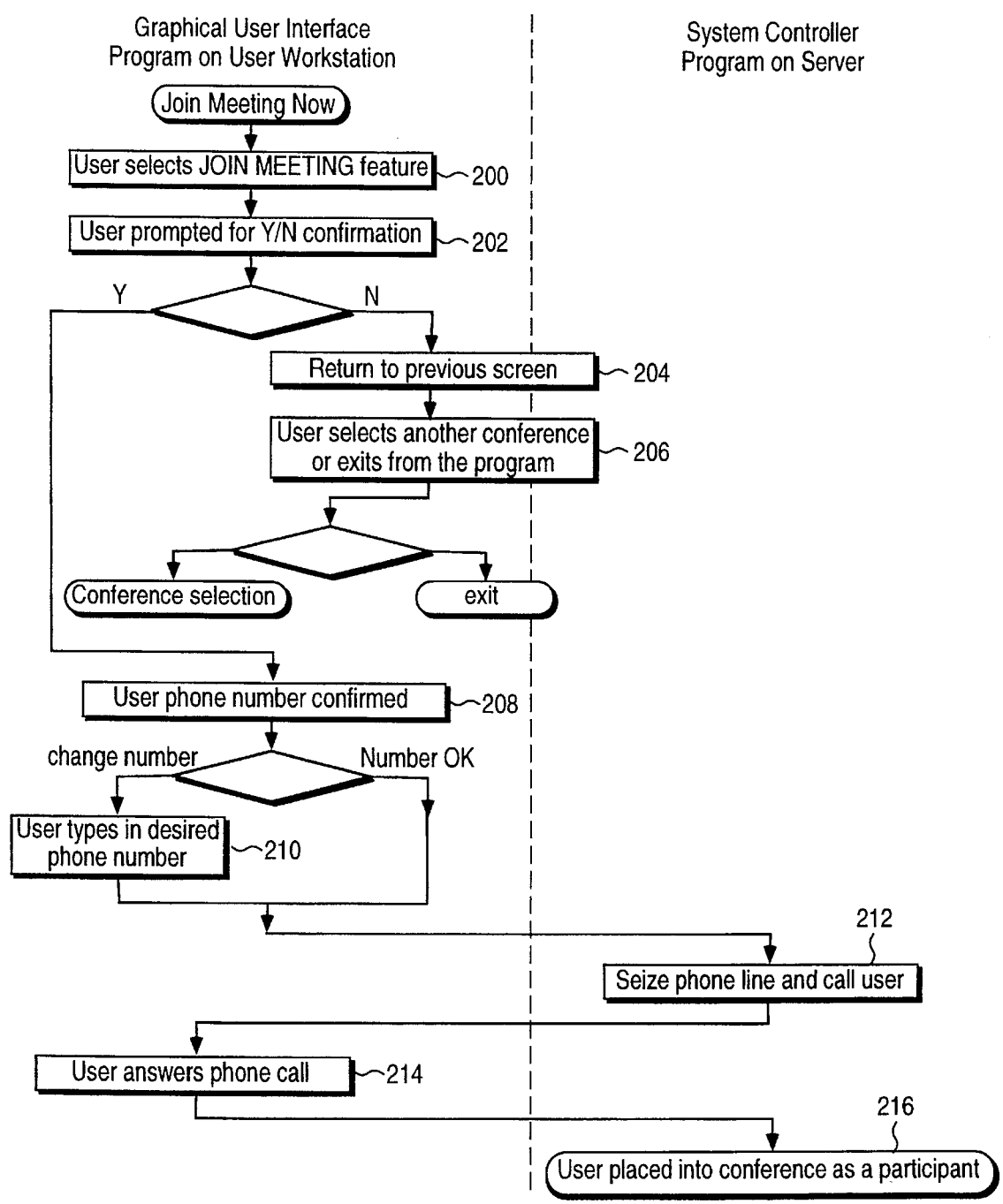
FIG. 7 is a flowchart illustrating a method by which the system of FIG. 1 allows a user to join an audio conference in progress.
Figure 8:
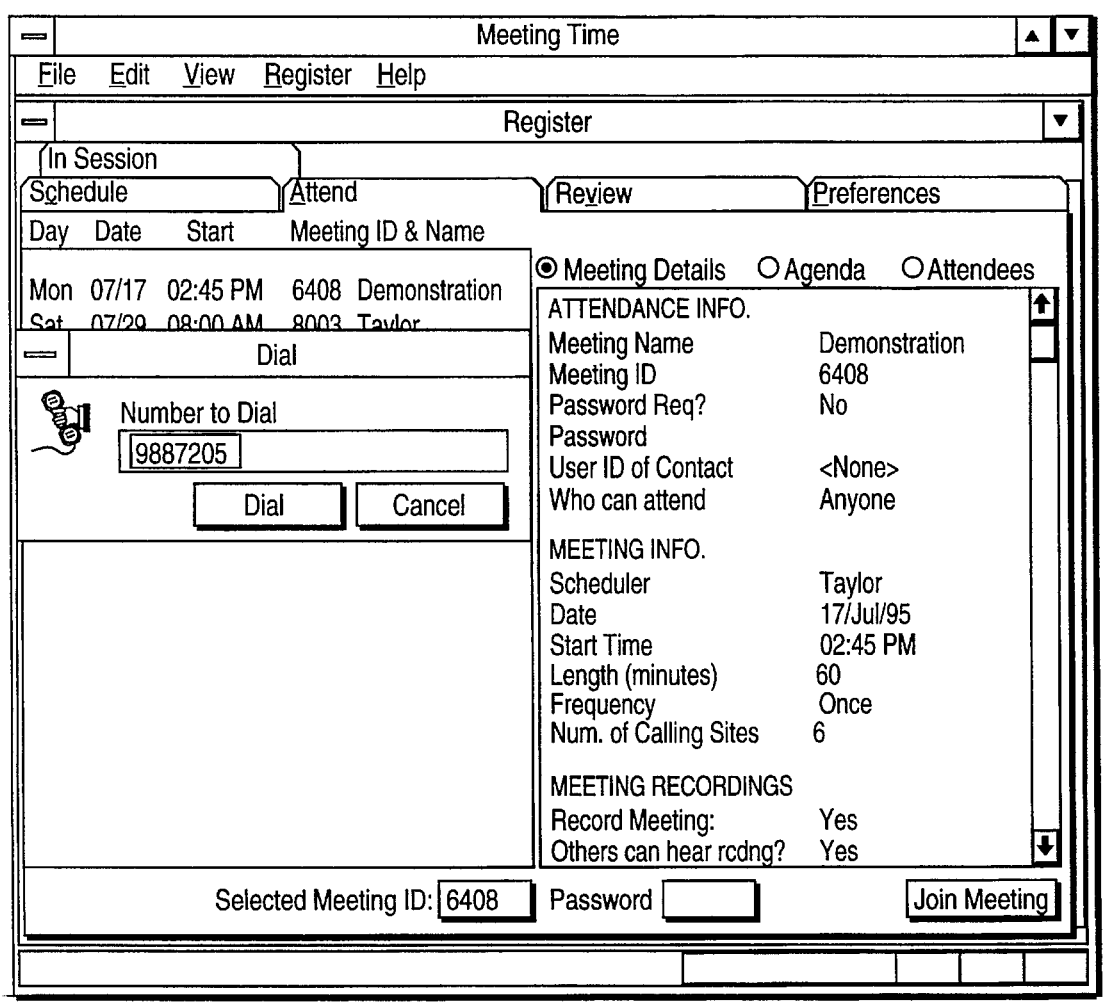
FIG. 8 illustrates a display screen, used in connection with the method of FIG. 7, through which a user reviews and modifies a telephone number for dialing by the system.

FIG. 7 illustrates steps formed by the system in response to the user clicking the "join meeting now" button, step 200. Initially, the system requests confirmation from the user by displaying a confirmation screen (not shown), step 202. If confirmation is not provided, the GUI software returns to the previous screen, step 204, and allows the user to select another conference or to exit the program, step 206. If confirmation is provided, execution continues at step 208 where the GUI software requests confirmation of the user phone number. An appropriate display screen providing such confirmation is illustrated in FIG. 8. The user may choose to change the listed phone number. Such may be required if user has logged in at a different site or perhaps if the user wishes to join the audio conference using a cellular phone, rather than a fixed telephone. If so, the user enters a new phone number, step 210. In either case, the entered phone number is transmitted to the system controller which seizes a phone line and initiates a telephone call to the user at the listed phone number, step 212. Once the phone rings, the user answers the phone call, step 214 and is then placed into the audio conference as a participant, step 216. As noted, depending upon the predetermined meeting parameters, the system may announce the name of the end user audibly to all other participants. In one implementation, when the GUI software is initially loaded and initialized, the user is required to call the central server and record his or her name in their own voice. Thereafter, the system uses the recorded name when generating audio arrival and departure prompts. However, alternative systems may be employed for storing and/or generating arrival and departure audio prompts. For example, voice synthesis software may be employed to convert the textual name of the user to an audible name.

Figure 9:
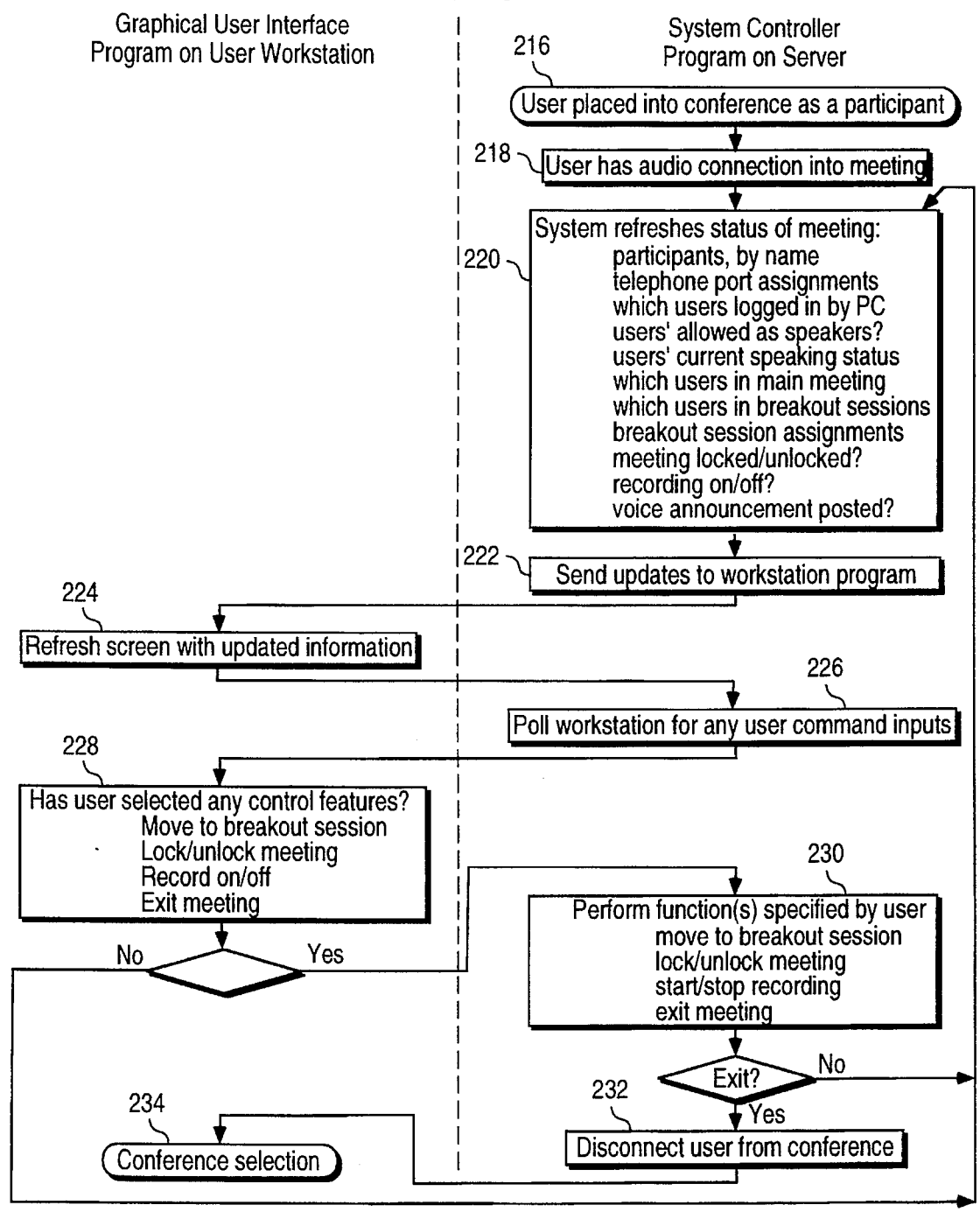
FIG. 9 is a flowchart illustrating a method, performed by the system of FIG. 1, whereby a user who has joined an audio conference can review conference information, join sub-conferences, and eventually disconnect from the conference.

Further steps performed by the system are illustrated in FIG. 9. Once the user is placed into the conference as a participant and the user has an audio connection into the meeting, step 218, the system software running within the central server refreshes status information stored by the system, step 220. The meeting status information set forth in block 220 of FIG. 9 identifies the status of the audio conference as it is in progress. Status information includes the names of each actual participant in the meeting and the telephone port employed to contact that participant by phone. Status information also identifies which of the participants in the meeting are actually logged into the system through their remote computer. Other information includes an identification of which participants are allowed to speak during the meeting and which participants are currently speaking. A determination of which speakers are currently speaking may be employed using conventional techniques, perhaps by sensing the audio volume levels on the telephone port associated with each end user.

Status information may also identify which participants are in the main audio conference and which have entered break out sessions or sub-conferences. Telephone ports for associated break out sessions are also represented. Status information may also represent whether the meeting is locked or unlocked. By locked, it is meant that no further participants may join the meeting. Whether the conference is locked or unlocked is controlled by the system organizer. Likewise, the status information identifies whether the audio conference is currently being recorded by the system and whether voice announcements have been posted.

The status information illustrated in block 220 can be alternatively stored within a database (not shown) associated with audio conferencing subsystem 28 (FIG. 1). Functionality associated therewith may be performed in accordance with techniques described in the aforementioned U.S. patent application. Accordingly, details by which the status information is obtained, recorded, updated and used will not be further described herein.

Once the central server has refreshed the meeting status information, updates of the status information are transmitted to the GUI of the user, step 222.

Figure 10:
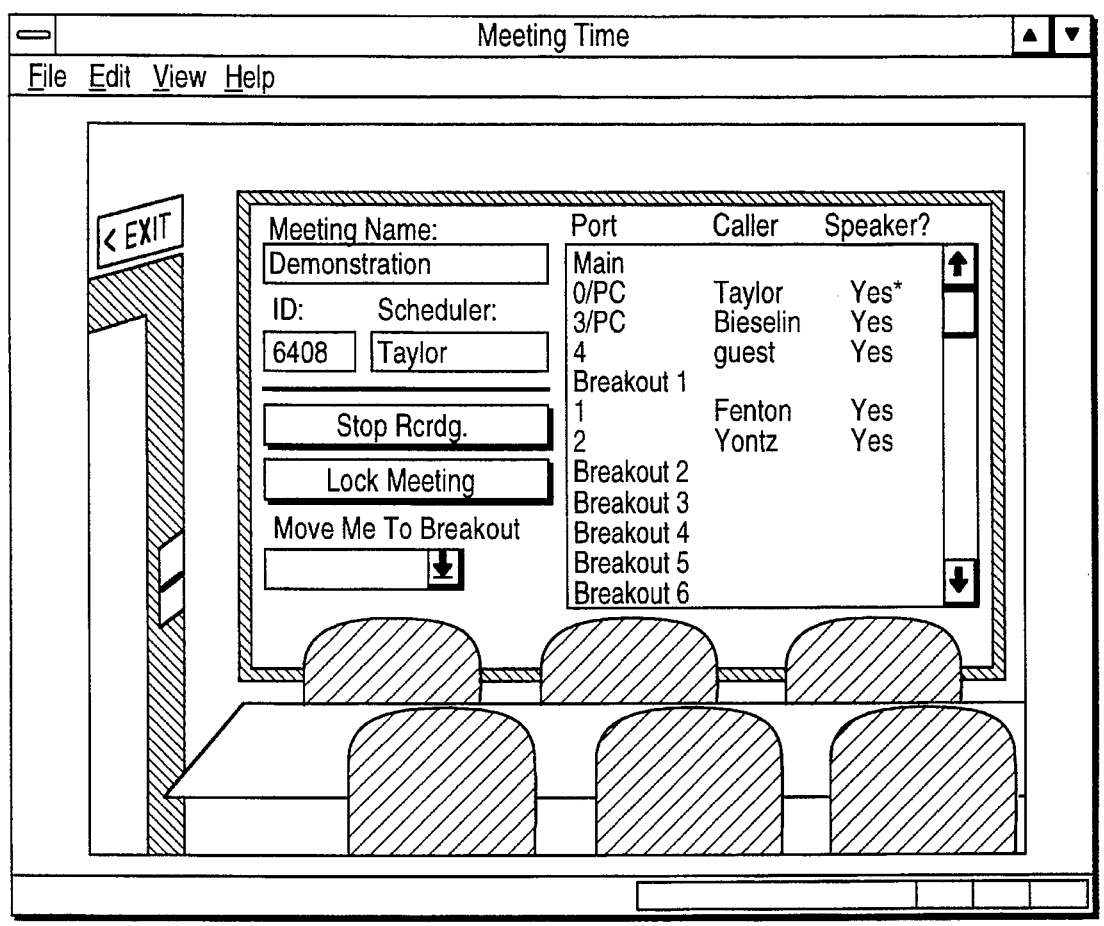
FIG. 10 is a graphical display, used in connection with the method of FIG. 9, for displaying information relevant to the audio conference and for receiving commands from the user.

FIG. 10 illustrates a display screen presented to the end user during the audio conference. Information within the display screen is refreshed, step 224, using the update information transmitted from the central server. As can be seen from FIG. 10, the display screen presents information identifying the meeting name, meeting ID and scheduler or meeting organizer. The screen also displays each participant in the audio conference and whether the participant is currently within the main audio conference or within a separate "break out" session. Within the exemplary audio conference information illustrated in FIG. 10, three participants are in the main audio conference and two have joined a break out session or sub-conference. For each participant, the system displays the name of the participant, whether the participant is an authorized speaker, and whether the participant is logged into the system using a remote computer employing the GUI software. Each participant who is actually speaking at any one time is identified by an asterisk. Within the exemplary illustrated, "Taylor" is currently speaking within the main audio conference. No one is currently speaking within the break out number one sub-conference.

For audio conference participants who are not registered as end users in the system, but who are merely calling into the audio conference using a direct dial line, the system identifies the participant as "guest".

While the conference is in session, the user may start or stop recording of the meeting and, if authorized to do so, may lock the meeting to prevent others from joining. If the user is currently in the main audio conference, activation of "lock meeting" function prevents any others from joining the overall audio conference. If the user is within a break out session, activation of the lock meeting function merely locks the break out session to prevent others from joining that session.

To transition from the main conference to a break out session, the user may type the name of the break out session within a field entitled "Move Me to Breakout" or, in a possible alternative implementation, the user may simply drag his or her name using the mouse from the main conference listing to a selected break out session. Each end user may move himself or herself to a break out session but cannot move other participants to the break out session. Hence, to initiate a break out session, end user must mention over the telephone that he would like selected other users to join him in the break out session. Then, each user moves himself or herself to the selected break out session. To terminate a break out session and return to the audio conference, each participant in the break out session merely repeats the above process but specifies "main" instead of a breakout session number.

To determine whether a user has entered new information or commands within his or her GUI display screen, the system controller periodically polls each end user remote computer, step 226. If the end user has selected a control or command feature, step 228, then the central server performs the specified function, step 230. If the user indicates a desire to exit the meeting, perhaps by double clicking on the exit button at the top left hand corner of the GUI display screen of FIG. 10, the system disconnects the user from the audio conference, step 232, and the GUI software of the remote computer of the end user returns to the audio conference selection screen of FIG. 6 at step 234. Otherwise, execution returns to step 220 where the system again refreshes status information of the meeting. Execution continues within the loop defined by FIG. 9 until the user exits the audio conference.

Figure 11:
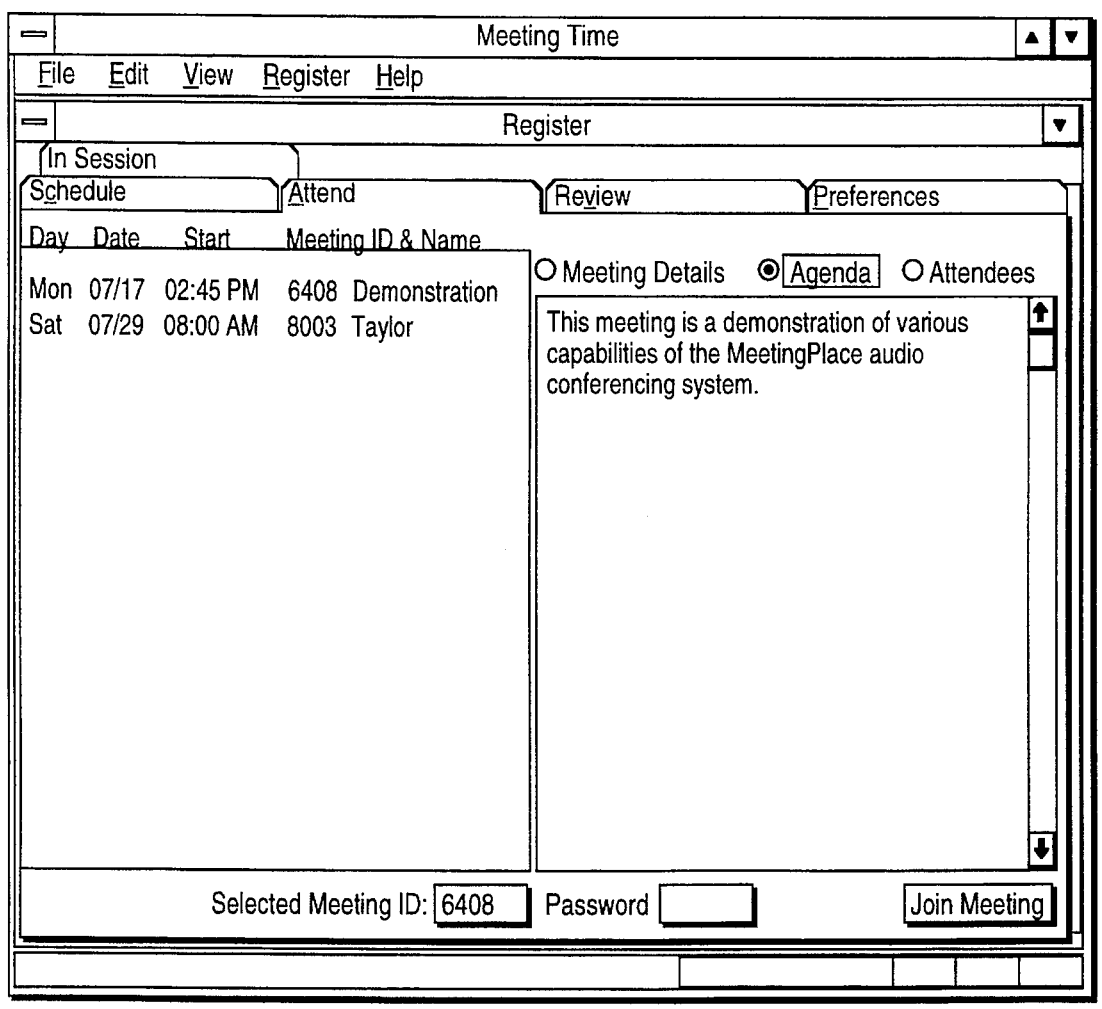
FIG. 11 is a graphical display, used in connection with the method of FIG. 4, for displaying the agenda of a selected audio conference.
Figure 12:
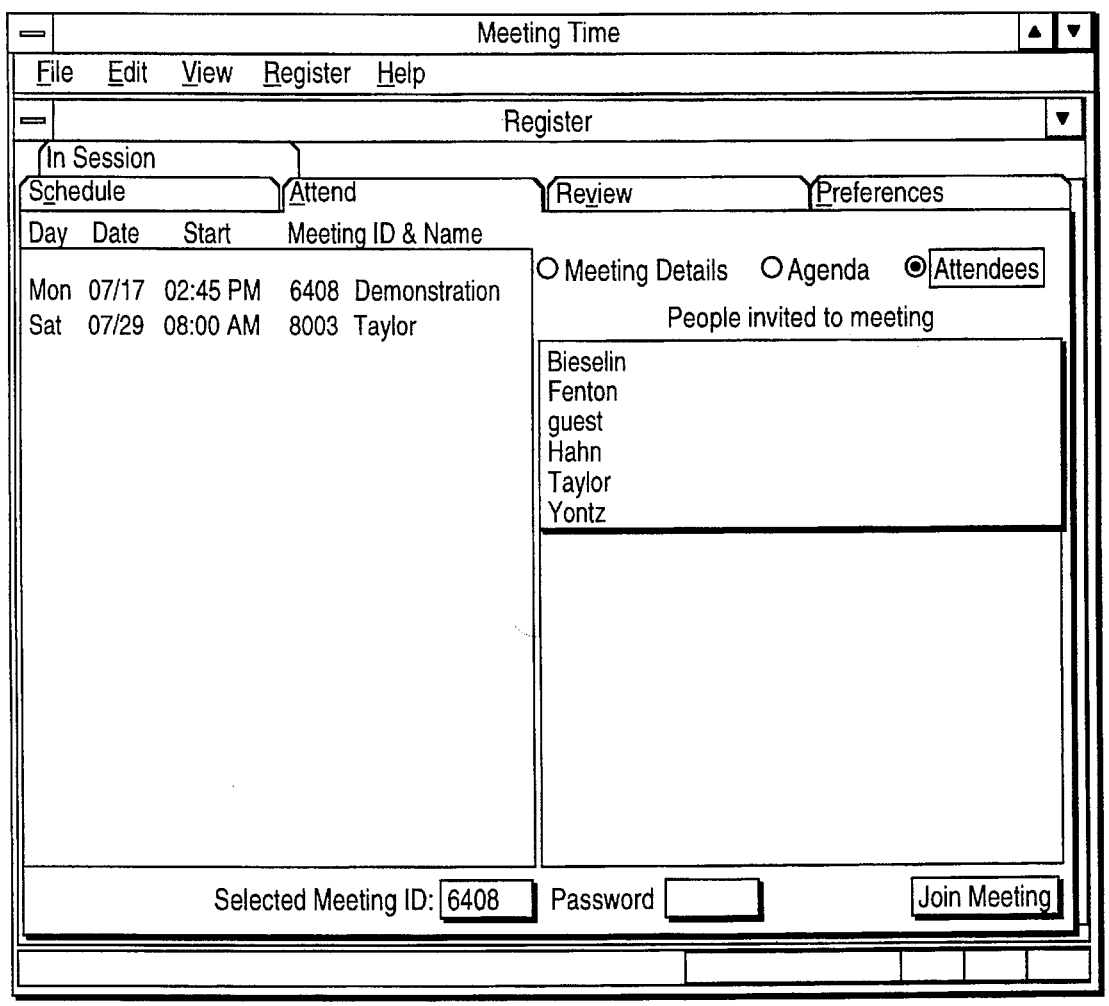
FIG. 12 is a graphical display for use with the method of FIG. 4 providing a list of audio conference attendees.

Thus far, the "show meeting details" and "join meeting now" functions available from the display screen of FIG. 6 have been described. From the display screen of FIG. 6, user may also select "view the textual agenda" of the meeting or "view the attendee list" of the meeting. FIG. 11 illustrates the resulting display screen if the view meeting agenda is selected. FIG. 12 illustrates an exemplary screen displayed if the view attendee list is selected.

What has been described is the method and apparatus for coordinating and implementing audio conferences whereby participants in the audio conference may control many aspects of the conference or their participation therein using GUI software running on a remote computer. By allowing interface using the GUI software program, significantly greater functionally is provided over previous systems, such as the one described in the '720 patent application, wherein communication to the audio conferencing system is limited to pressing touch-tone telephone buttons. In one implementation of the present invention, however, the ability to interact with the system using only a touch-tone telephone is retained. Such allows conference participants, who have not installed the GUI software, to participate in the meeting and to perform many functions such as activating or deactivating recording or entering or leaving break out sessions.

The embodiment described herein may be designed and configured in accordance with conventional techniques. For example, software components of the invention may be developed using conventional programming techniques. Other portions of the system are configured in a hardware also in accordance with conventional techniques.

The invention has been described by way of an exemplary implementation which illustrates general principles of the invention. The invention should not be construed as being limited to the exemplary implementations described herein.

What is claimed is:

1. In an audio conferencing system having a central control system connected to a telephone system for coordinating an audio conference using the telephone system, an improvement comprising:

a plurality of user computers remote from said central control system said user computers connected to said central control system through a computer network, said plurality of user computers operated by a plurality of corresponding users, each user computer comprising a processing unit, a display controlled by the processing unit and a user input device, each user computer running a computer program for receiving an indication by a corresponding user, through the user input device, of a selected audio conference that the corresponding user wishes to join as a participant and transmitting said indication of the selected audio conference to said central control system;

said central control system receiving said indication of the selected audio conference and controlling the telephone system to call a determined number associated with a telephone of the corresponding user to connect the telephone of the corresponding user to the selected audio conference.

2. An audio conferencing system comprising:

a telephony conference subsystem that performs conferencing of a plurality of participants coupled via telephones;

a server coupled to the telephony conference subsystem to control operations performed on the telephony conference subsystem;

a user computer system coupled to the server through a data communication network, said computer system comprising a processor, a display and an input device; and a graphical user interface (GUI) program executed by the user computer system to generate displays of information on the display and receive input by the user using the input device, said user computer system executing the GUI program prompting the user to enter a user identification and forwarding the user identification to the server;

said server further verifying that the user is registered and supplying to the user computer system executing the GUI program information regarding scheduled audio conferences that the user scheduled or for which the user is a designated participant; and said user computer system executing the GUI program displaying the information regarding the audio conferences on the display and enabling the user to select a conference to attend using the input device.

3. The audio conferencing system of claim 2, wherein the information regarding scheduled audio conferences comprises the name of the conference.

4. The audio conferencing system of claim 2, wherein the information regarding scheduled audio conferences further comprises passwords to be entered in order to attend a conference.

5. The audio conferencing system of claim 2 wherein the information regarding scheduled audio conferences comprises the date and time for an audio conference.

6. The audio conferencing system of claim 2 wherein the information regarding scheduled audio conferences comprises a scheduled frequency of an audio conference, said frequency also indicating whether the audio conference is scheduled on a one-time basis or a recurring basis.

7. The audio conferencing system of claim 2 wherein the information regarding scheduled audio conferences comprises a predetermined length of an audio conference.

8. The audio conferencing system of claim 2 wherein the information regarding scheduled audio conferences comprises a predetermined number of telephone line ports reserved for an audio conference.

9. The audio conferencing system of claim 2 wherein the information regarding scheduled audio conferences comprises a predetermined list of the invited participants for an audio conference.

10. The audio conferencing system of claim 2 wherein the information regarding scheduled audio conferences comprises a predetermined textual agenda of an audio conference.

11. The audio conferencing system of claim 2 wherein the information regarding scheduled audio conferences comprises a list of actual participants of an audio conference while the audio conference is in progress.

12. The audio conferencing system of claim 2 wherein the information regarding scheduled audio conferences comprises an indication of which participants of an audio conference are speaking while the conference is in progress, said indication being updated substantially in real time as speaker status changes.

13. The audio conferencing system of claim 2 wherein the information regarding scheduled audio conferences comprises an indication of which participants of an audio conference are allowed to speak during the audio conference, said indication being updated substantially in real time as speaker privilege status changes.

14. The audio conferencing system of claim 2 wherein the information regarding scheduled audio conferences comprises a list of actual participants of an audio conference while the conference is in progress, said list further displaying groupings of the participants into sub-conferences if participants have joined sub-conferences, said list being updated substantially in real time as the assignment of participants to said conference changes.

15. The audio conferencing system of claim 2 wherein the information regarding scheduled audio conferences comprises an indication of whether an audio conference is being recorded while the audio conference is in progress, said indication being updated substantially in real time as recording on/off status changes.

16. The audio conferencing system of claim 2 wherein the user computer system further receives an indication from the user of whether the user wishes to activate or deactivate recording of an audio conference while the conference is in progress.

17. The audio conferencing system of claim 2 wherein the user computer system further receives an indication from the user of an access limitation to the audio conference by subsequent participants while the conference is in progress.

18. The audio conferencing system of claim 2, wherein the server receives the user's selection of the conference to attend and controls the telephony conference subsystem to ring a user's telephone, wherein the user answers the telephone to attend the conference.

19. The audio conferencing system of claim 18, wherein the server confirms a telephone number of the user's telephone to ring by communicating the telephone number to the user computer system executing the GUI program, said user computer system displaying the telephone number on the display and enabling the user to confirm the number or change the number to ring, said user computer system communicating the confirmation or changed number back to the server.

20. The audio conferencing system of claim 2 wherein the user computer system further receives an indication that the user wishes to terminate participation in the audio conference.

21. The audio conferencing system of claim 20 wherein the user computer system further transmits a signal to the server indicating termination of the participation of the user in the audio conference; and wherein the server further controls the telephone system to disconnect the telephone call to the telephone of the user.

22. In an audio conferencing system having a central server connected to a telephone system and a user computer connected to the server through a network, wherein the user computer includes a processing unit, a display controlled by the processing unit and a user input device, a method comprising the steps of:

displaying a list of available audio conferences that the user is authorized to join on the display of the user computer;

said user selecting an audio conference to join of the displayed list of available audio conferences;

receiving an indication of a selected audio conference through the input device that a user operating the user computer wishes to join;

transmitting said indication of a selected audio conference to said central server from said user computer through said network; and controlling the telephone system to call a predetermined telephone number associated with a telephone of the user to connect the telephone of the user to the selected audio conference.

23. The method of claim 22 further including the steps of:

receiving a log in ID from the user through the user computer;

transmitting the log in ID to the central server;

comparing the log in ID with a list of predetermined acceptable log in IDs stored by the server; and controlling connection of the telephone to the selected audio conference based upon receipt of a valid log in ID.

24. The method of claim 22 further including the step of displaying predetermined names of audio conferences, on the display of the user computer, for which the user is authorized to join.

25. The method of claim 22 further including the step of displaying, and receiving changes to, the predetermined telephone number on the display of the user computer.

26. The method of claim 22 further including the step of displaying a predetermined password, on the display of the user computer, associated with an audio conference for which the user is authorized to join.

27. The method of claim 22 further including the step of displaying, on the display of the user computer, a predetermined date and time for an audio conference for which the user is authorized to join.

28. The method of claim 22 further including the step of displaying, on the display of the user computer, an identification of a scheduled frequency of an audio conference for which the user is authorized to join, said frequency also indicating whether the audio conference is scheduled on a one-time basis or recurring basis.

29. The method of claim 22 further including the step of displaying, on the display of the user computer, a predetermined length of an audio conference for which the user is authorized to join.

30. The method of claim 22 further including the step of displaying, on the display of the user computer, a predetermined number of telephone line ports reserved for an audio conference for which the user is authorized to join.

31. The method of claim 22 further including the step of displaying, on the display of the user computer, a predetermined list of invited participants for an audio conference for which the user is authorized to join.

32. The method of claim 22 further including the step of displaying, on the display of the user computer, a predetermined textual agenda of an audio conference for which the user is authorized to join.

33. The method of claim 22 further including the step of displaying, on the display of the user computer, a list of actual participants of an audio conference while the audio conference is in progress.

34. The method of claim 22 further including the step of displaying, on the display of the user computer, an indication of which participants of an audio conference are speaking while the conference is in progress, said indication being updated substantially in real time as speaker status changes.

35. The method of claim 22 further including the step of displaying, on the display of the user computer, an indication of which participants of an audio conference are allowed to speak during the audio conference, said indication being updated substantially in the real time as speaker privilege status changes.

36. The method of claim 22 further including the step of displaying, on the display of the user computer, a list of actual participants of an audio conference while the conference is in progress, said list further displaying groupings of the participants into sub-conferences if participants have joined sub-conferences, said list being updated substantially in real time as the assignment of participants to said conference changes.

37. The method of claim 22 further including the step of displaying, on the display of the user computer, an indication of whether an audio conference is being recorded while the audio conference is in progress, said indication being updated substantially in real time as recording on/off status changes.

38. The method of claim 22 further including the step of receiving, from the input device of the user computer, an indication from the user of whether the user wishes to activate or deactivate recording of an audio conference while the conference is in progress.

39. The method of claim 22 further including the step of receiving, from the input device of the user computer, an indication from the user of an access limitation to the audio conference by subsequent participants while the conference is in progress.

40. The method of claim 22 further including the step of receiving, from the input device of the user computer, an indication that the user wishes to terminate participation in the audio conference.

41. The method of claim 40 wherein the user computer transmits a signal to the central server indicating termination of participation of the user in the audio conference and wherein the central server controls the telephone system to disconnect the telephone call to the telephone of the user.

42. A user computer executing a graphical user interface (GUI) computer program for use by end users of an audio conferencing system for controlling operations of the audio conferencing system without the assistance of an operator, said user computer communicating with the audio conferencing system by local area network (LAN) communication, said user computer further enabling a registered end user of the audio conferencing system to log in through the user computer with an ID uniquely identifying that user, and to select a particular audio conference to initiate or a particular established audio conference to join, the selection of the particular audio conference causing the initiation of a telephone call connecting said end user to the audio conference, the call being initiated under user control through said user computer executing said GUI computer program.

43. The user computer of claim 42, in which the user computer executing the GUI program displays on a display device of the user computer the name of an audio conference for which the end user is the designated organizer or a designated invited participant.

44. The user computer of claim 42, in which the user computer executing the GUI program displays on a display device of the user computer the direct dial number of an audio conference for which the end user is the designated organizer or a designated invited participant.

45. The user computer of claim 42, in which the user computer executing the GUI program displays on a display device of the user computer the password of an audio conference for which the end user is the designated organizer or a designated invited participant.

46. The user computer of claim 42, in which the user computer executing the GUI program displays on a display device of the user computer the scheduled date and time of an audio conference for which the end user is the designated organizer or a designated invited participant.

47. The user computer of claim 42, in which the user computer executing the GUI program displays on a display device of the user computer the scheduled frequency of an audio conference for which the end user is the designated organizer or a designated invited participant, said frequency indicating whether said audio conference is scheduled on a one-time basis or a recurring basis.

48. The user computer of claim 42, in which the user computer executing the GUI program displays on a display device of the user computer the scheduled length of an audio conference for which the end user is the designated organizer or a designated invited participant.

49. The user computer of claim 42, in which the user computer executing the GUI program displays on a display device of the user computer the quantity of telephone line ports reserved for an audio conference for which the end user is the designated organizer or a designated invited participant.

50. The user computer of claim 42, in which the user computer executing the GUI program displays on a display device of the user computer a list of invited participants for an audio conference for which the end user is the designated organizer or a designated invited participant.

51. The user computer of claim 42, in which the user computer executing the GUI program displays on a display device of the user computer a text agenda of an audio conference for which the end user is the designated organizer or a designated invited participant.

52. The user computer of claim 42, in which the user computer executing the GUI program displays on a display device of the user computer a list of actual participants of said audio conference during the time the audio conference is in progress.

53. The user computer of claim 42, in which the user computer executing the GUI program displays on a display device of the user computer an indication of which participants of said audio conference are speaking while the audio conference is in progress, said indication being updated on the display device in real time as speaker status changes.

54. The user computer of claim 42, in which the user computer executing the GUI program displays on a display device of the user computer an indication of which participants of said audio conference are allowed to speak into the audio conference, said indication being updated on the display device in real time as speaker privilege status changes.

55. The user computer of claim 42, in which the user computer executing the GUI program displays on a display device of the user computer a list of actual participants of said audio conference during the time the audio conference is in progress, said list showing the groupings of said participants into sub-conferences if said participants have moved into sub-conferences of said audio conference, said list being updated on the display device in real time as the assignment of participants to said conference changes.

56. The user computer of claim 42, in which the user computer executing the GUI program displays on a display device of the user computer an indication of whether said audio conference is being recorded at any time while the audio conference is in progress, said indication being updated on the display device in real time as the recording on/off status changes.

57. The user computer of claim 42, in which the user computer executing the GUI program controls activation or deactivation of recording of said audio conference at any time while the audio conference is in progress, said activation or deactivation being accomplished through selection of the corresponding function displayed on a display device of the user computer.

58. The user computer of claim 42, in which the user computer executing the GUI program limits access to said audio conference by subsequent callers while said audio conference is in progress by selection of the corresponding function displayed on a display device of the user computer.

59. The user computer of claim 42, in which the user computer executing the GUI program receives input indicating termination of participation in said audio conference by selection of the corresponding function displayed on a display device of the user computer, said termination causing the telephone call connecting said end user to said audio conference to be disconnected.

60. The user computer of claim 42, in which the user computer executing the GUI program displays on a display device of the user computer information on scheduled audio conferences for which the end user is the designated organizer or designated invited participant.

* * * * *

UNITED STATES PATENT AND TRADEMARK OFFICE
CERTIFICATE OF CORRECTION

PATENT NO. : 5,619,555

DATED : April 8, 1997

INVENTOR(S) : Fenton et al.

It is certified that error appears in the above-identified patent and that said Letters Patent is hereby corrected as shown below:

Title page, item [57],

In the Abstract at line 1 delete "A" and insert --An--

Signed and Sealed this

Thirtieth Day of November, 1999

Attest:

Q. TODD DICKINSON

Attesting Officer

Acting Commissioner of Patents and Trademarks